(12) United States Patent
Barone (10) Patent No.: US 6,921,900 B2
(45) Date of Patent: *Jul. 26, 2005

(54) EFFECTIVE QUAD-DETECTOR OCCUPANCY SENSORS AND MOTION DETECTORS

(75) Inventor: Stephen Barone, Dix Hills, NY (US)

(73) Assignee: Electro-Optic Technologies, LLC, Dix Hills, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 10/879,563

(22) Filed: Jun. 28, 2004

(65) Prior Publication Data

US 2004/0245472 A1 Dec. 9, 2004

Related U.S. Application Data

(63) Continuation of application No. 09/952,051, filed on Sep. 11, 2001, now Pat. No. 6,756,595
(60) Provisional application No. 60/231,595, filed on Sep. 11, 2000.

(51) Int. Cl.⁷ .................................................. G01J 5/02
(52) U.S. Cl. .................. 250/349; 250/353; 250/DIG. 1
(58) Field of Search .............................. 250/349, 353, 250/DIG. 1

(56) References Cited

U.S. PATENT DOCUMENTS 3,036,219 A  5/1962 Thompson

| 3,524,180 A | 8/1970 | Cruse |
| 3,631,434 A | 12/1971 | Schwarz |
| 3,703,718 A | 11/1972 | Berman |
| 3,886,360 A | 5/1975 | Reiss et al. |
| 3,958,118 A | 5/1976 | Schwarz |
| 4,122,427 A | 10/1978 | Karsh |
| 4,321,594 A | 3/1982 | Galvin et al. |

(Continued)

FOREIGN PATENT DOCUMENTS

| DE | 3615946 A1 | 11/1987 |
| DE | 3803277 A1 | 9/1989 |
| EP | 0 050 750 A1 | 5/1982 |
| EP | 0 050 751 A1 | 5/1982 |
| EP | 0 256 651 A2 | 2/1988 |
| EP | 0 358 929 A2 | 3/1990 |
| EP | 0 501 253 A | 9/1992 |
| GB | 2299405 | 7/1996 |
| JP | 54 998 | 6/1979 |
| JP | 3 95480 | 4/1991 |
| WO | WO 88 04038 A | 6/1988 |
| WO | WO 92/10819 | 6/1992 |
| WO | WO 93 19385 | 9/1993 |
| WO | WO 99 40453 | 8/1999 |

*Primary Examiner*—Constantine Hannaher
(74) *Attorney, Agent, or Firm*—Carter, Deluca, Farrell & Schmidt, LLP (57) ABSTRACT

A method and apparatus for improving the sensitivity, angular resolution and range of motion detectors, occupancy sensors and similar systems are described. Specifically, an improved infrared input and detection section is described which utilizes two dual-detectors configured to optimally operate equivalent to a single quad-detector.

20 Claims, 7 Drawing Sheets

U.S. PATENT DOCUMENTS

| | | |
|---|---|---|
| 4,342,987 A | 8/1982 | Rossin |
| 4,404,468 A | 9/1983 | Kleinschmdit |
| 4,420,688 A | 12/1983 | LeBars |
| 4,429,223 A | 1/1984 | Wagli |
| 4,429,224 A | 1/1984 | Wagli et al. |
| 4,442,359 A | 4/1984 | Lederer |
| 4,661,720 A | 4/1987 | Cameron, Jr. et al. |
| 4,663,521 A | 5/1987 | Maile |
| 4,768,020 A | 8/1988 | Chen |
| 4,779,240 A | 10/1988 | Dorr |
| 4,876,445 A | 10/1989 | McMaster |
| 4,912,331 A | 3/1990 | Owers |
| 4,978,843 A | 12/1990 | Yamakawa |
| 5,105,084 A | 4/1992 | Nagai et al. |
| 5,189,393 A | 2/1993 | Hu |
| 5,266,807 A | 11/1993 | Neiger |
| 5,308,985 A | 5/1994 | Lee |
| 5,491,467 A | 2/1996 | Tracy et al. |
| 5,640,143 A | 6/1997 | Myron et al. |
| 5,915,332 A | 6/1999 | Young et al. |
| 5,929,445 A | 7/1999 | Barone |
| 6,215,399 B1 | 4/2001 | Shpater |
| 6,756,595 B2 | 6/2004 | Barone |

EFFECTIVE QUAD-DETECTOR OCCUPANCY SENSORS AND MOTION DETECTORS

RELATED APPLICATIONS

This application is a continuation of U.S. patent application Ser. No. 09/952,051 filed Sep. 11, 2001 (now U.S. Pat. No. 6,756,595), which claims the benefit of U.S. Provisional Application Ser. No. 60/231,595 filed Sep. 11, 2000.

BACKGROUND

1. Technical Field

The present disclosure relates to passive infrared motion detectors, occupancy sensors and similar devices, and more particularly to the infrared input section and detection system of these devices.

2. Description of the Related Art

Passive infrared motion detectors and occupancy sensors employ an array of Fresnel lenses covering an entrance aperture. This lens array is illuminated by thermal infrared radiation from the object of interest. For any particular angle of incidence each of the elements in the lens array covering the entrance aperture generates a focal spot. The array of lenses is designed so that as the object of interest moves across its field of view the system of focal spots moves across the sensitive area of a detector. The varying electrical output signal generated by the detector is processed to yield information about the state of motion of the object of interest.

Each element of the lens array is designed to focus incident infrared radiation in a small angular range onto the sensitive area of a detector. The (active) angular sectors in which the elements of the lens array focus incident infrared radiation onto the sensitive area of a detector are interlaced by (passive) angular sectors within which incident infrared radiation is not focused onto the sensitive area of the detector by any element of the lens array. Moving infrared radiators are detected when they move from one angular sector across a boundary into an adjacent angular sector leading to a rapid change in the amount of infrared power falling on the sensitive area of the detector. Ordinarily, the sectors are all approximately the same angular size and the maximum angle through which a radiating object of interest can move without being detected, i.e. the angular resolution of the system, is equal to the angular size of one of these sectors. This assumes that the size and velocity of the radiating object and its distance from the entrance aperture are such that the intensity of the infrared signal is greater than the minimum that can be detected by the system electronics.

One way to improve the angular resolution of the system is to increase the number of elements in the lens array. More specifically, for an entrance aperture of fixed size the angular resolution of the system is approximately inversely proportional to the number of elements in the lens array. Thus, in order to achieve the smallest angular resolution, a lens array with as many elements as possible must be employed. On the other hand, the sensitivity and effective range of the system decrease if the size of the individual lens elements of the array is decreased. The phrase "sensitivity of the system" refers to the size of the smallest radiating object that can be detected as a function of its distance from the detector. Thus, compromises must be made between the size of the entrance aperture, sensitivity, range and angular resolution of the system. For example, for any desired sensitivity and range there is a minimum size for each of the individual lenses of the array and hence a maximum number of elements for an entrance aperture of fixed size and a corresponding minimum angular resolution.

SUMMARY

The present disclosure relates to a new input lens configuration and detection scheme which can be employed, for example, to: 1) increase the sensitivity and range of motion detectors and occupancy sensors with an entrance aperture of fixed size without decreasing the angular resolution of the system or, 2) improve the angular resolution of a system with an entrance aperture of fixed size without decreasing the sensitivity or range of the system or, 3) decrease the size of the entrance aperture required for a given sensitivity, range and angular resolution or, 4) reduce the distance that the unit must protrude in, for example, a wallbox installation in order to achieve acceptable performance at wide angles. The relative importance of each of these characteristics of motion detectors and occupancy sensors depends on the application in which the system is employed.

In simplest terms, the infrared input section and detection scheme disclosed herein consists of an array of lens elements followed by a first radiation detector including a pair of sensitive areas and a second radiation detector having a pair of sensitive areas. The pair of dual detectors, such as, for example pyrodetectors are positioned so that as the direction of incident radiation varies, at least one element of the lens array at least partially focuses the incident radiation onto at least three of the four sensitive areas of the two detectors, thereby forming an effective quad-detector. Typical pyrodetectors used in prior art occupancy sensors and motion detectors have two sensitive areas on their surface each of which is 1 mm wide, separated by 1 mm. As a focal spot of any particular element of the lens array moves across this 3 mm region, four electrical signals are generated as the spot moves onto or off of a sensitive area. These signals are generated as the infrared source moves across the angular boundaries which separate regions of space where the focal spot is on a sensitive area as opposed to regions of space where the focal spot is not on one of the sensitive areas of the detector. Motion detectors and occupancy sensors which employ a detector with two sensitive areas can achieve improved performance as compared to units that employ a detector with only one sensitive area, since each focal spot gives rise to four electrical signals as the infrared source moves as opposed to two electrical signals for a detector with only one sensitive area. In many applications a detector system with three or four sensitive areas can improve the performance of the occupancy sensor/motion detector beyond that achievable with a detector with only two sensitive areas.

The difficulty with using two detectors side, by side in order to obtain four sensitive areas, is that because of the physical size of a pyrodetector the sensitive areas on one detector are much more than 1 mm from the sensitive areas on the other detector. Because of this, the angular regions which define those regions of space wherein a focal spot is on a sensitive area as opposed to those angular regions where a focal spot is not on a sensitive area are not even approximately uniformly distributed. Nevertheless the infrared input section and detection scheme disclosed herein is capable of producing an almost uniform distribution of these angular sectors. For the purpose of illustration, suppose that a certain range, angular resolution and sensitivity can be achieved by employing some particular lens array. If the number of elements of the array and their size is not changed, but a quad-detector of the type disclosed herein is employed, the number of electrical signals is effectively doubled as an infrared source moves across the field of view of the lens array. The angular resolution has been improved by a factor of two. Alternatively, if a quad-detector of the type disclosed herein is employed and the number of elements in the lens array is halved, the angular resolution is unchanged but the infrared power in the focal spot is doubled with a corresponding increase in range and sensitivity. In some applications the optimum design is a hybrid system which employs a traditional array of Fresnel lenses and/or mirrors to cover some angular ranges and a design of the type disclosed herein for other angular ranges.

Also, by employing a quad-detector of the type disclosed herein it is possible to achieve the same performance with a much smaller entrance aperture. This is of importance, for example, in applications where accidental damage or casual vandalism of the entrance aperture lens/cover is a problem. One aesthetically appealing configuration is a rocker switch (e.g. Leviton's Decora rocker switch) with a small infrared entrance aperture in the center, both vertically and horizontally, of the rocker. This would convert the traditional rocker switch to an "automatic switch" i.e. an ordinary switch with an occupancy sensor feature. This aesthetically appealing configuration can also be achieved without a quad-detector. However, a quad-detector can be employed to enlarge the field of view and/or decrease the required aperture size for a given sensitivity and range. This technique can be applied to other wiring devices e.g. toggle switches, dimmers, timers, outlets, etc. These new designs maintain the traditional appearance of the device while adding the occupancy sensor/motion detector feature in an inconspicuous way. As previously noted in each of these applications a quad-detector of the type disclosed herein may or may not be employed depending on the specified size of the entrance aperture and the required field of view, sensitivity and range.

For any occupancy sensor or motion detector, the field of view can be increased by employing mirrors adjacent to the entrance aperture to reflect wide angle rays towards the center of the system. These mirrors may be positioned before or after the lens array. Further, in some applications the optimum system is a hybrid in which the mirrors direct and/or focus infrared radiation from some angular sectors directly onto a detector while infrared radiation in other angular sectors is passed through the lens array to the detector. Infrared radiation from other angular sectors may be processed differently.

All of the preceding is equally applicable to, for example, wall and ceiling units, indoor and outdoor units in lighting, heating, ventilation and/or security applications. Also, it is equally applicable to passive and active infrared and optical systems. Further, the implementations disclosed herein may be used in single technology systems or in combination with motion detectors/occupancy sensors based on other technologies e.g. active infrared, ultrasonic or microwave systems.

BRIEF DESCRIPTION OF THE DRAWINGS

The above and other objects, features, and advantages of devices in accordance with the present disclosure will become more apparent in light of the following detailed description of the preferred embodiments thereof taken in conjunction with the attached drawings in which.

DETAILED DESCRIPTION OF THE PREFERRED EMBODIMENTS

Turning now to the drawings, in which like reference numerals identify similar or identical elements throughout the several views, FIG. 1 illustrates the infrared input and detector sections of one possible embodiment of a passive infrared motion detector or occupancy sensor which employs an array of lens elements and a quad-detector system of the type disclosed herein.

Figure 1A:
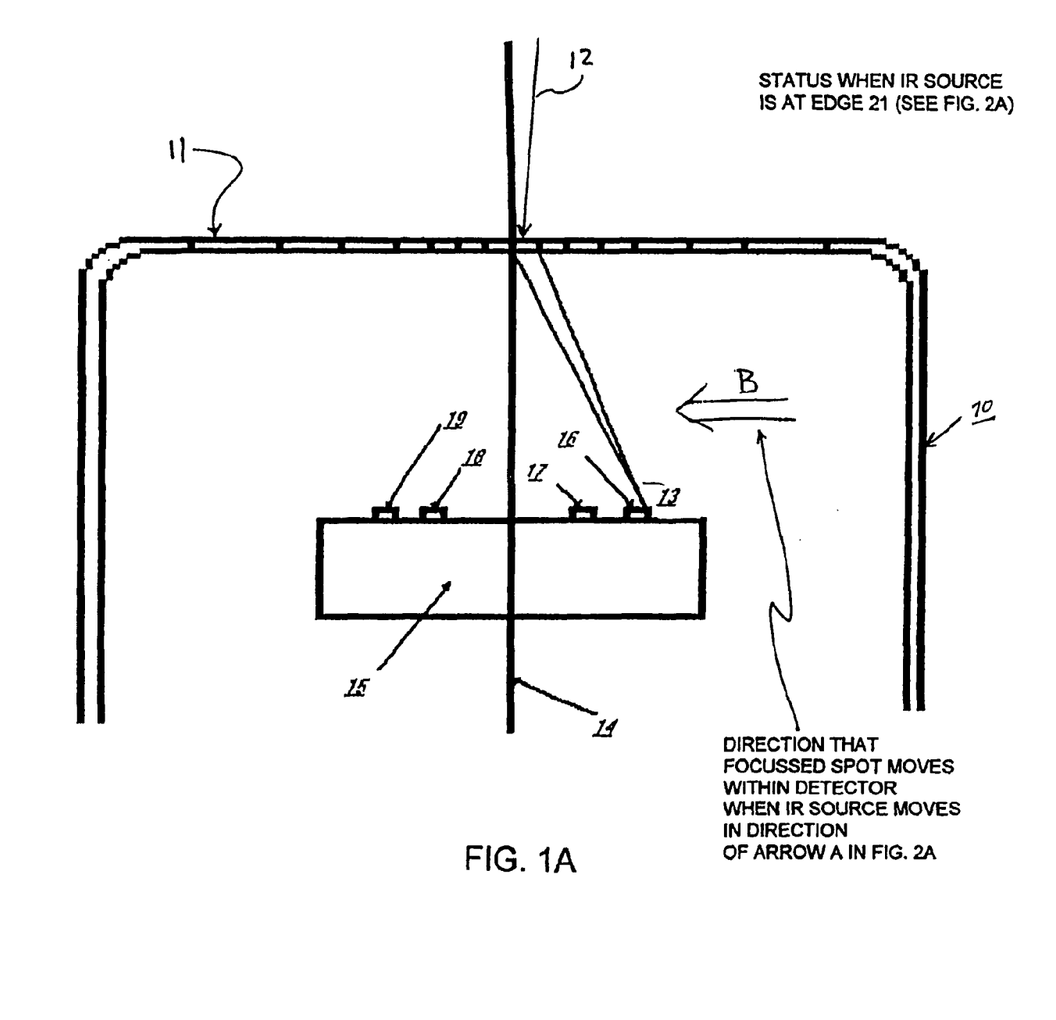
FIGS. 1A–D are schematic diagrams illustrating an exemplary embodiment of the infrared input section and detection scheme of motion detectors and occupancy sensors employing an infrared input section and detection scheme in accordance with the present disclosure.

With reference to FIG. 1A, a Fresnel lens array 11 spans the entrance aperture of a motion detector housing 10. Each element of the lens array 11 intercepts a small fraction of the input infrared radiation 12 incident from some particular direction and focuses it to a spot in the focal plane of that element, e.g. 13 is the focal point of the first element of the lens array to the right of the vertical centerline 14. Accordingly, the number of focal spots is equal to the number of elements of the lens array 11. As the source of the infrared radiation 12 moves (such as, for example in the direction of arrow A in FIG. 2A), the angle of incidence of the incident infrared radiation 12 changes and the system of focal spots moves across the four sensitive areas of the quad-detector 15 (such as, for example, in the direction of arrow B in FIG. 1A). This detector consists of two dual detectors positioned near each other as illustrated.

As the infrared source moves, the electrical output of the detector changes abruptly as a focal spot moves onto or off of any one of the plurality of sensitive areas 16–19 of the quad-detector 15. As the incident direction of infrared radiation changes from nearly perpendicular to the entrance aperture clockwise towards the direction of radiation indicated by 12, the focal spot 13, for example, moves from the extreme right hand side of the right most sensitive area of the quad-detector (see FIG. 1A) towards the left and eventually off of the left hand side of the sensitive area 17 (see FIG. 1B), typically a distance of 3 mm. Further clockwise rotation of the direction of incidence moves the focal spot 13 from the left hand edge of sensitive area 17 to the right hand edge of sensitive area 18 (see FIG. 1C). A separation of approximately 5 mm is preferred between the left hand edge of sensitive area 17 and the right hand edge of sensitive area 18. With this detector geometry the angular separation between the two active angular sectors generated as the focal spot crosses sensitive areas 16–17 and the two active angular sectors generated as the focal spot crosses sensitive areas 18–19 is precisely the correct size to contain five angular sectors (two active, three passive) generated by another element of the lens array 11. This is discussed further in connection with FIG. 2 below.

It is fortuitous that dual pyrodetectors commonly employed in occupancy sensors and motion detectors are manufactured in standard TO-39 or TO-5 housings which have a diameter of 8.1 mm, for example, Heimann LHi874, LHi878 and LHi968. This is only 0.1 mm larger than the ideal of 8 mm required to obtain a 5 mm separation of the two innermost sensitive areas of the detector. These housings have a thin rim at the bottom with a diameter of 9.2 mm. If two housings of this type are placed side by side the distance between the two innermost sensitive areas is 6.2 mm which is approximately 25% larger than the ideal separation of 5 mm. In most applications this is a tolerable departure from the ideal, some pairs of angular sectors would be 25% larger than adjacent pairs. Alternatively, the rim can be partially removed or the top surfaces of the two detectors can be tipped a few degrees towards each other. This would be sufficient to reduce the distance between the two innermost sensitive areas to the ideal of 5 mm.

Figure 1B:
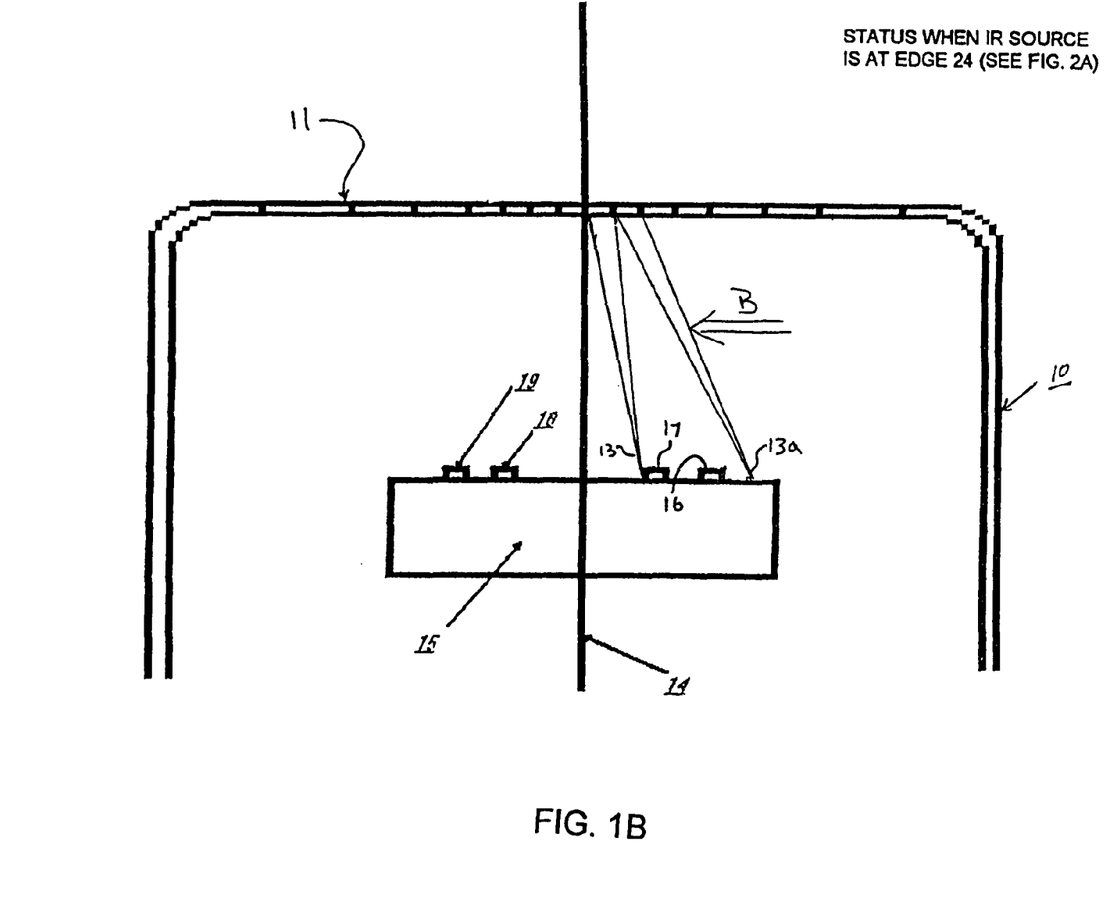
Figure 1C:
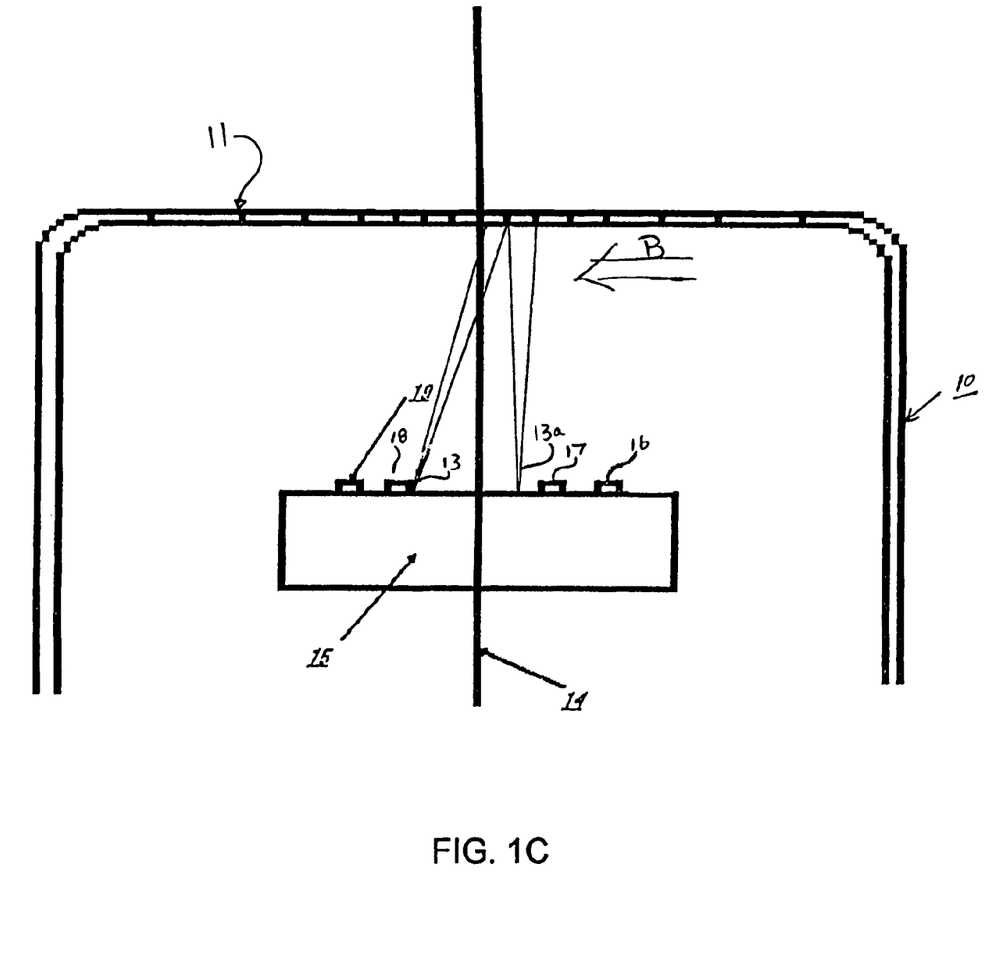
Figure 1D:
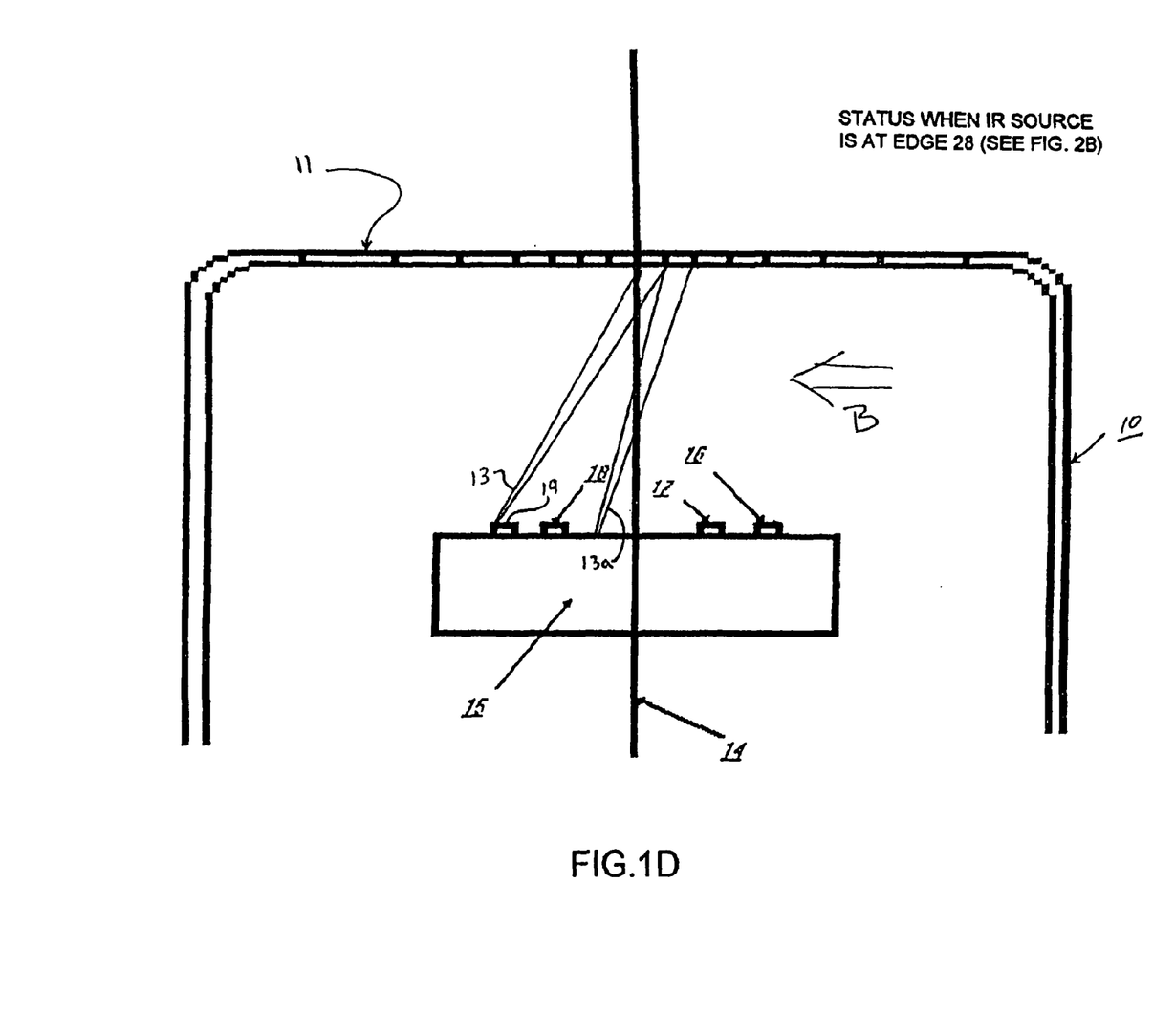
Figure 2A:
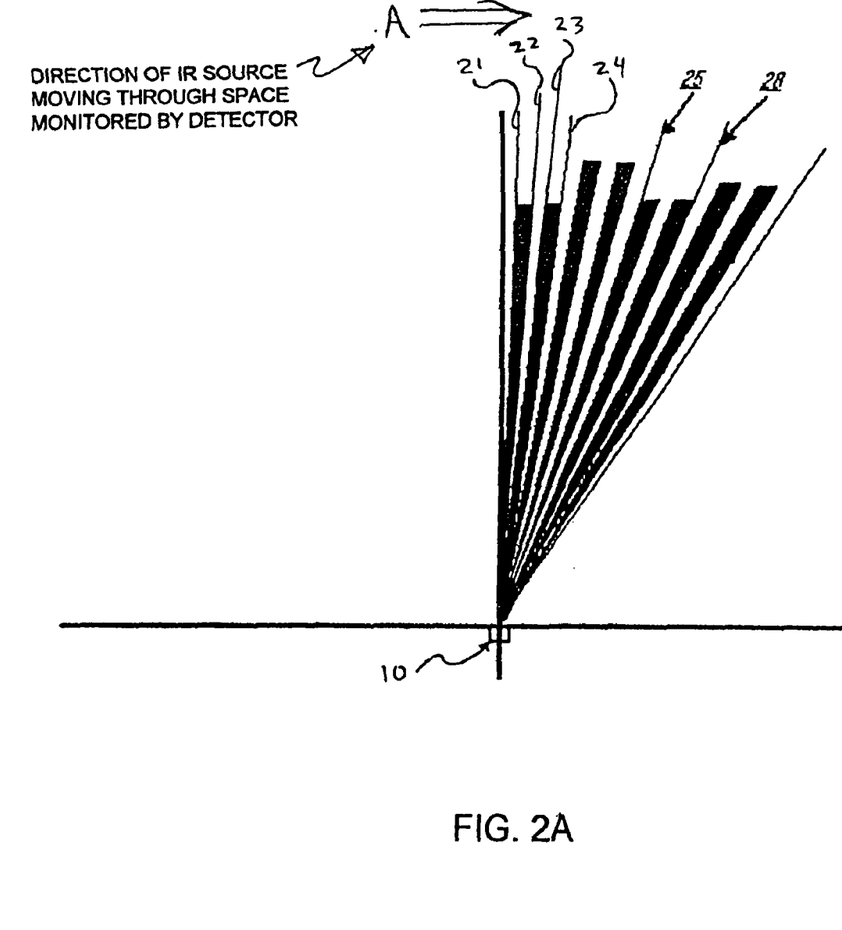
FIGS. 2A and 2B are a schematic diagrams illustrating the angular sectors which define the angular resolution of an exemplary embodiment of motion detectors and occupancy sensors employing an infrared input section and detection scheme in accordance with the present disclosure.
Figure 2B:
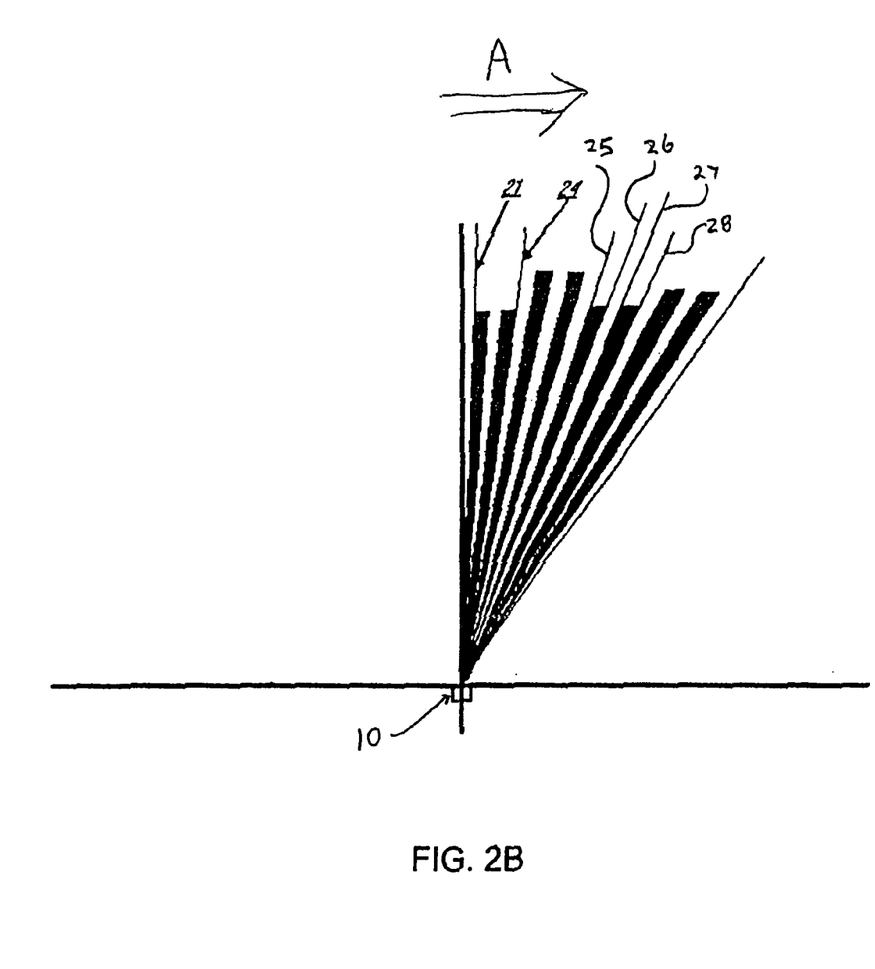

FIG. 2A illustrates the edges 21–24 of the angular regions defined by the focal spot 13 crossing the four edges of the sensitive areas 16–17 of the quad-detector (see FIGS. 1A and 1B). The edges 25–28 (see FIG. 2B) correspond to the focal spot 13 crossing the four edges of the sensitive areas 18–19 of the quad-detector (see FIGS. 1C and 1D). These two groups of four edges are separated by an angular region corresponding to the separation between the left hand edge of sensitive area 17 and right hand edge of sensitive area 18. Notice that if this separation is 5 mm as opposed to a 1 mm separation of sensitive areas of 1 mm width, then the angular size of this region is precisely correct to contain two active angular regions and three passive angular regions. These five angular sectors are generated by the focal spot 13a of a second element of the Fresnel lens array passing from the right hand edge of sensitive area 16 (see FIG. 1B) to the left hand edge of sensitive area 17 (see FIG. 1C). A second group of five sectors clockwise from the group 25–28 is generated as this second focal spot (13a) moves from the right hand edge of sensitive area 18 (see FIG. 1D) to the left hand edge of sensitive area 19. Thus by employing a quad-detector of the type disclosed herein two elements of the lens array 11 produce twice as many edges as the same two elements would produce with a prior art dual detector. This can be used to double, for example, the number of angular sectors produced by a given number of array elements without reducing the range or sensitivity of the system. Alternatively, doubling the size of the elements of the lens array doubles the power received by any array element with a corresponding increase in range and sensitivity without sacrificing angular resolution. This process can be repeated for each pair of array elements on each side of the vertical centerline 14 of the system. An unpaired element if necessary, can be used to generate an additional pair of active sectors. Of course it is also possible to double the width of a lens array element and halve its height. With the detection scheme disclosed herein this would leave the performance characteristics of the system unchanged but make room for another tier of Fresnel lenses which could be employed in a number of ways. Finally, it is not necessary to treat each element of the lens array in the same way or to restrict the changes to doubling and halving which were only used for the purpose of illustration.

Figure 3:
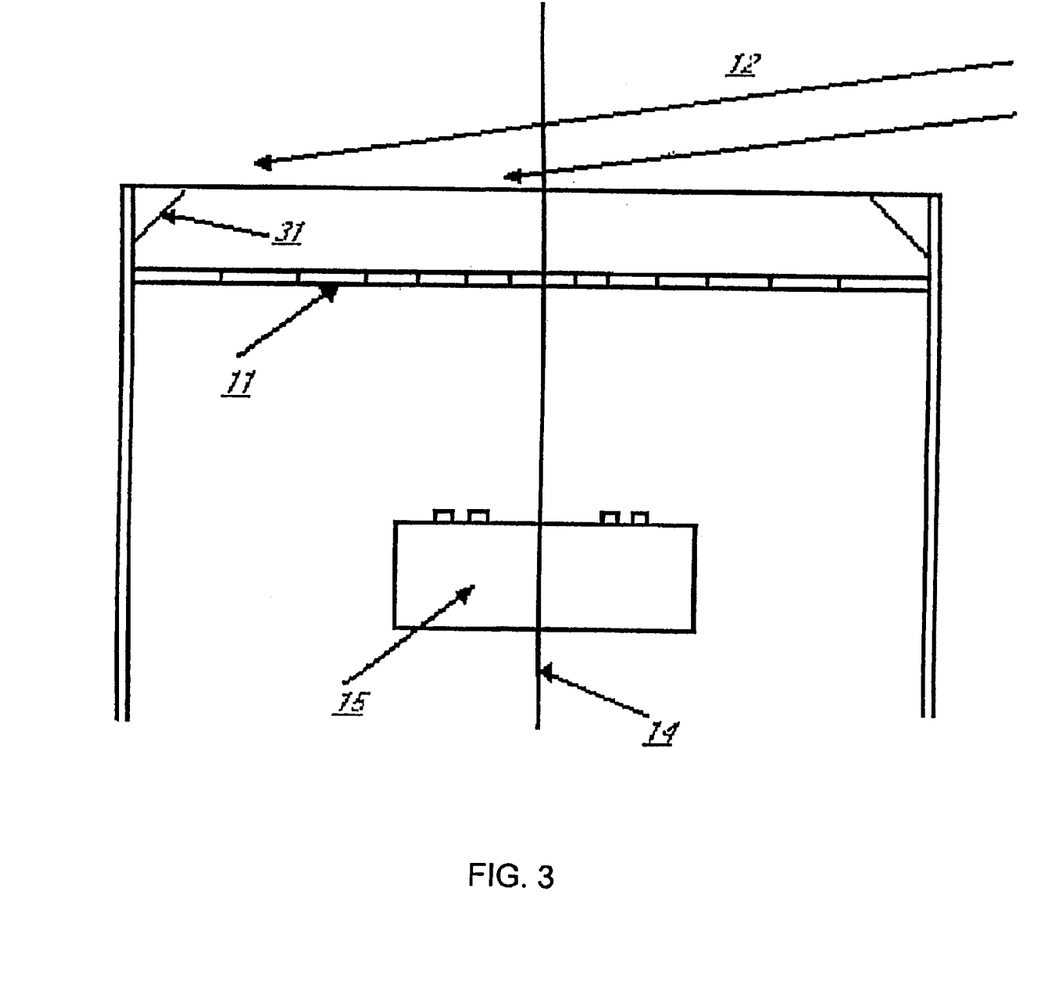
FIG. 3 is a schematic diagram illustrating an exemplary embodiment of the infrared input section of motion detectors and occupancy sensors employing an infrared input section and detection scheme and wide angle mirrors in accordance with the present disclosure.

FIG. 3 is a schematic diagram of the input lens and detection system of the present disclosure supplemented with wide angle mirrors 31. These mirrors perform the same function as previously described in U.S. Pat. No. 5,929,445, which is incorporated herein by reference, in connection with occupancy detectors and motion detectors employing prior art detection schemes.

While the present invention has been described in detail with reference to the preferred embodiments, they represent mere exemplary applications. Thus, it is to be clearly understood that many variations can be made by anyone of ordinary skill in the art while staying within the scope and spirit of the present invention.

I claim:

1. A radiation detection system, comprising:
    a housing including a surface having an opening for receiving incident radiation;
    an array of lens elements disposed across the opening of the housing;
    a first radiation detector including a pair of sensitive areas; and
    a second radiation detector including a pair of sensitive areas, wherein the first and second radiation detectors are positioned so that as the direction of the incident radiation varies, at least one element of the lens array at least partially focuses the incident radiation successively onto at least three of four sensitive areas,
    each of the sensitive areas generating an abrupt change in electrical output to indicate the presence of a moving infrared source in response to focused incident radiation moving onto or off of any one of the at least three of four sensitive areas.

2. The radiation detection system according to claim 1, wherein the lens array is a Fresnel lens array.

3. The radiation detection system according to claim 1, wherein the first detector is positioned adjacent to the second detector.

4. The radiation detection system according to claim 1, wherein each of the sensitive areas for each of the first and second detectors is about 1 mm wide and separated from one another by about 1 mm.

5. The radiation detection system according to claim 4, wherein the lens array has a center line and wherein the first detector is disposed on a first side of the center line and the second detector is disposed on a second side of the center line.

6. The radiation detection system according to claim 5, wherein the pair of sensitive areas of the first detector are separated a distance of about 5 mm from the pair of sensitive areas of the second detector.

7. The radiation detection system according to claim 5, wherein a sensitive area of the pair of sensitive areas of the first detector is separated by about 5 mm from a sensitive area of the pair of sensitive areas of the second detector.

8. The radiation detection system according to claim 1, further comprising:
    means disposed within the housing adjacent to the opening and structured and arranged for directing radiation received thereon to the interior of the housing.

9. The radiation detection system according to claim 1, wherein the first detector in combination with the second detector define a quad-detector.

10. The radiation detection system according to claim 1, wherein the lens array further comprises:
    at least one additional element configured and adapted to at least partially focus incident radiation onto a sensitive area of a detector for at least some angles of the incident radiation between those angles for which the at least one lens element at least partially focuses incident radiation onto a sensitive area of a detector.

11. An occupancy sensor including a radiation detection system, comprising:
    a housing including a surface having an opening for receiving incident radiation;
    an array of Fresnel lens elements disposed across the opening of the housing; and a radiation detector including at least four sensitive areas positioned so that as the direction of the incident radiation varies, at least one element of the lens array at least partially focuses the incident radiation successively onto at least three of the four sensitive areas each of the sensitive areas generating an abrupt change in electrical output to activate lighting in response to focused incident radiation moving onto or off of any one of the at least three of four sensitive areas.

12. The occupancy sensor according to claim 11, wherein the radiation detector comprises:

a first sensitive area;

a second sensitive area spacially separated from the first sensitive area;

a third sensitive area spacially separated from the second sensitive area on a side opposite the first sensitive area; and a fourth sensitive area spacially separated from the third sensitive area on a side opposite the second sensitive area.

13. The occupancy sensor according to claim 12, wherein the spatial separation between the first and second sensitive areas is about 1 mm, the spatial separation between the second and third sensitive areas is about 5 mm, and the spatial separation between the third and fourth sensitive areas is about 1 mm.

14. The occupancy sensor according to claim 11, further comprising:

directing means disposed within the housing adjacent to the opening and structured and arranged to direct radiation received thereon to the interior of the housing.

15. The occupancy sensor according to claim 14, wherein the directing means includes at least one mirror disposed adjacent an edge of the opening.

16. The occupancy sensor according to claim 11, wherein the at least four sensitive areas define a quad-detector.

17. The occupancy sensor according to claim 11, wherein the lens array further comprises:

at least one additional element configured and adapted to at least partially focus incident radiation onto a sensitive area of a detector for at least some angles of the incident radiation between those angles for which the at least one lens element at least partially focuses incident radiation onto a sensitive area of a detector.

18. A radiation detection system, comprising:

a housing having an opening;

four independent, radiation-detecting sensitive areas located within the housing;

an array of lens elements, at least one element of the lens array at least partially focusing incident radiation successively onto at least three of the four sensitive areas as the direction of the incident radiation varies, each one of the four independent, radiation-detecting sensitive areas generating an abrupt change in electrical output to activate a device in response to focused incident radiation moving onto or off of any one of the four sensitive areas.

19. A radiation detection system as in claim 18 wherein the device is selected from the group consisting of a light switch, an alarm, a heating system, a ventilation system and a security system.

20. A radiation detection system as in claim 18 wherein the four sensitive areas define a quad-detector.

* * * * *